United States Patent
Ramanathan

[15] 3,650,665
[45] Mar. 21, 1972

[54] DYEING AND PRINTING ACRYLIC MATERIAL USING DISPERSE DYESTUFFS

[72] Inventor: Visvanathan Ramanathan, Basel, Switzerland

[73] Assignee: Ciba Limited, Basel, Switzerland

[22] Filed: Sept. 23, 1969

[21] Appl. No.: 860,405

[30] Foreign Application Priority Data

Oct. 4, 1968   Switzerland ........................ 14836/68

[52] U.S. Cl. ........................................... 8/41, 8/177
[51] Int. Cl. .................................. C09b 29/36, D06p 1/18
[58] Field of Search ..................... 8/41, 177; 260/154, 157

[56] References Cited

UNITED STATES PATENTS 3,102,879   9/1963   Baumann et al. ...................... 260/157

Primary Examiner—George F. Lesmes
Assistant Examiner—Patricia C. Ives
Attorney—Harry Goldsmith, Joseph G. Kolodny and Mario A. Monaco

[57] ABSTRACT

A process for dyeing or printing acrylic textile material. wherein a dyestuff of the formula

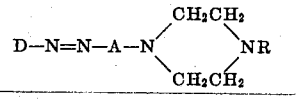

is used which is free from groups conferring solubility in water, and in which R is a hydrogen atom or a lower alkyl residue containing 1 to 4 carbon atoms that may be substituted by hydroxy or cyano, D is a residue of a diazo component and A is substituted or unsubstituted 1,4-phenylene residue.

7 Claims, No Drawings

DYEING AND PRINTING ACRYLIC MATERIAL USING DISPERSE DYESTUFFS

This invention provides a process for dyeing or printing fully synthetic textiles, especially those based on acrylic fibers, characterized by the use of dyestuffs of the formula

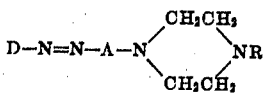

which are free of groups conferring solubility in water, such as sulphonic acid groups, and in which R is a hydrogen atom or a lower alkyl residue containing one to four carbon atoms, D is a residue of a diazo component and A is an optionally substituted 1,4-phenylene residue.

Preferably, the dyestuffs of the formula

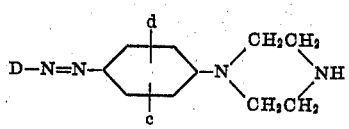

are used in which D has the same significance as above and $d$ denotes a hydrogen atom, a halogen atom, a lower alkyl residue containing one to four carbon atoms, a lower alkoxy residue containing one to four carbon atoms, an aryloxy residue or an aryl mercapto residue, and $c$ denotes a hydrogen or halogen atom, a lower alkyl residue containing one to four carbon atoms, a lower alkoxy residue containing one to four carbon atoms, an aryloxy residue or an arylmercapto residue, a trifluoromethyl group, an alkylsulphonyl group, preferably a methylsulphonyl or butylsulfonyl group, or an acylamino group which may be alkylated, preferably methylated, at the nitrogen atom, in which the acyl residue is the residue of an organic monocarboxylic acid for example a formyl, acetyl, propionyl, benzoyl or chloroacetyl residue, or of an organic monosulphonic acid for example a methane sulphonic, ethane sulphonic or p-toluene monosulphonic acid, or the residue of a carbonic acid monoester or monoamide, for example a phenoxycarbonyl, methoxycarbonyl, aminocarbonyl, butylaminocarbonyl or phenylaminocarbonyl residue.

Dyestuffs to be mentioned particularly are those of the formula

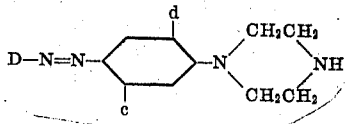

in which D is an unsubstituted or substituted monocyclic or bicyclic heterocyclic residue or a substituted benzene residue, and $c$ and $d$ have the above-mentioned significance.

Preferably, $d$ represents a hydrogen or chlorine atom or a lower alkyl or alkoxy containing up to four carbon atoms such as a methyl, methoxy, ethyl or ethoxy, phenylmercapto or phenyloxy group and $c$ represents one of the groups or atoms mentioned for $d$ or it may also represent a bromine atom or an acetylamino group.

The diazo residue D is principally derived from monocyclic or bicyclic amines of formula $D-NH_2$, for example any desired diazotizable heterocyclic amines which do not contain any acidic substituents conferring solubility in water, but especially from amines which possess a heterocyclic five-membered ring containing two or three hetero-atoms, particularly a nitrogen atom and one or two sulphur, oxygen or nitrogen atoms as hetero-atoms, such as amines of the thiazole, benzothiazole, imidazole, thiadiazole or isothiazole series, and amino-benzenes, especially those of the formula

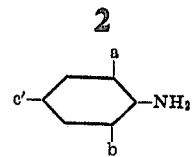

wherein $a$ denotes a hydrogen or halogen atom or an alkyl or alkoxy, nitro, cyano, carbalkoxy or alkylsulphone group, $b$ denotes a hydrogen or halogen atom or an alkyl, cyano or trifluoromethyl group, and $c'$ denotes a nitro, cyano, carbalkoxy or alkylsulphonyl group.

As examples the following may be mentioned: 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl- or benzyl)-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanatobenzthiazole, 2-amino-6-nitrobenzthiazole, 2-amino-6-carbethoxybenzthiazole, 2-amino-(4- or 6)-methylsulphonylbenzthiazole, 2-amino-1,3,4-thiadiazole, 2-amino-1,3,5-thiadiazole, 2-amino-4-phenyl-or -4-methyl-1,3,5-thiadiazole, 2-amino-5-phenyl-1,3,4-thiadiazole, 2-amino-3-nitro-5-methylsulphonyl-thiophene, 2-amino-3,5-bis-(methylsulphonyl)-thiophene, 5-amino-3-methyl-isothiazole, 2-amino-4-cyano-pyrazole, 2-(4'-nitrophenyl)-3-amino-4-cyanopyrazole, 3- or 4-aminophthalimide, aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cayno-4-nitrobenzene, and also 1-aminobenzene-2-, -3- or -4-sulphonic acid amides for example the N-methylamide or N,N-dimethylamide or N,N-diethylamide.

The dyestuffs to be used according to the invention have already been described in French Pat. of Addition 79,556 and in French Main Pat. No. 1,421,912, as intermediate products for the manufacture of quaternisable dyestuffs, but their direct use as dyestuffs for acrylic textiles is neither recommended nor made obvious in these patents.

In certain cases the use of mixtures of two or more of the dyestuffs to be used according to the process can be of advantage.

Amongst the synthetic materials to be dyes or printed according to the invention, there may be mentioned polyester fibers of polyesters obtained from terephthalic acid and diols, for example ethylene glycol and 1,4-dihydroxycyclohexane, and in particular acrylic fibers obtained from pure polyacrylonitrile or from copolymers of acrylonitrile with other vinyl compounds, for example vinyl chloride, vinylidene chloride, vinyl fluoride, vinyl acetate and vinyl propionate, vinylpyridine, vinylimidazole, vinyl alcohol, acrylic and methacrylic acid esters and/or acrylamides. The textile materials can be in the form of flocks, fibers, filaments, woven fabrics or knitted fabrics; the dyestuffs are particularly suitable for carpets.

For dyeing purposes, the dyestuffs are advantageously used in a finely divided form and dyeing is carried out with the addition of dispersing agents for example sulphite cellulose waste lye or synthetic anionic or preferably nonionic detergents or a combination of different wetting agents and dispersing agents. Nonionic surface-active agents are preferably employed, for example addition products of about 8 to 12 mols of ethylene oxide and 1 mol of p-tert.-octylphenol, 6 to 15 mols of ethylene oxide and castor oil, 17 to 25 mols of ethylene oxide and the alcohol of the formula $C_{16}H_{33}OH$, and also ethylene oxide addition products of di-($\alpha$-phenylethyl)-phenols, tert.-dodecylthioether, polyamines or higher fatty amines; in the latter case the addition products of, for example, 30 mols of ethylene oxide and 1 mol of the amine $C_{12}H_{25}NH_2$ or $C_{18}H_{37}NHB2$ may be used.

As a rule it is advantageous to convert the dyestuffs before use, into a dyeing preparation which contains a dispersing agent and the finely divided dyestuff in such a form that on dilution of the dyestuff preparation with water a fine dispersion is obtained. Such preparations can be obtained in a known manner, for example by grinding the dyestuff in the dry or wet state with or without addition of dispersing agents during the grinding process. The dyestuffs can also be employed in the form of solutions, for example in sulpholan, N,N-dimethylformamide, N-methylpyrrolidone or dimethylsulphoxide, and dyeing may be carried out in a purely organic or in an aqueous-organic bath.

In order to obtain intense dyeings on polyethylene terephthalate fibers in an aqueous medium, it is advantageous to add a swelling agent to the dyebath or to carry out the dyeing process under pressure at temperatures above 100° C., for example at 120° C. Suitable swelling agents are aromatic carboxylic acids, for example benzoic acid or salicylic acid, phenols for example o- or p-hydroxydiphenyl, salicylic acid methyl ester, aromatic halogen compounds for example chlorobenzene, o-dichlorobenzene or trichlorobenzene, phenylmethylcarbinol or diphenyl. When dyeing under pressure, it is advantageous to render the dyebath weakly acid, for example by adding a weak acid, for example acetic acid.

The dyestuffs to be used in accordance with the invention are particularly suitable for dyeing by the so-called thermofixing process, according to which the fabric to be dyes is impregnated with an aqueous dispersion of the dyestuff which advantageously contains 1 to 50 percent of urea and a thickener, especially sodium alginate, preferably at temperatures of at most 60° C., and squeezed in the usual manner. Advantageously, the impregnated goods are squeezed in such a way as to retain an amount of dyeing liquor corresponding to 50 to 100 percent of their starting weight.

In order to fix the dyestuff, the fabric impregnated in this way is heated, advantageously after prior drying for example in a stream of warm air, to temperatures of above 100° C., for example between 180° and 210° C.

A particularly preferred aspect of the present invention is the dyeing of textiles based on polyacrylonitrile. In this case dyeing is carried out in a weakly acid dyeing liquor, preferably by the exhaustion process.

The dyeing obtained in accordance with the present process are preferably subjected to an after-treatment, for example by heating with an aqueous solution of a nonionic detergent.

The dyestuff used according to the present process can also be applied by printing. For this purpose a printing paste is for example used which contains the finely dispersed dyestuff in addition to the auxiliary agents generally used in printing, for example wetting agents and thickeners.

In the examples which follow the parts, unless otherwise stated, denote parts by weight, the percentages denote percentages by weight.

EXAMPLE 1

1 Part of the dyestuff of the formula

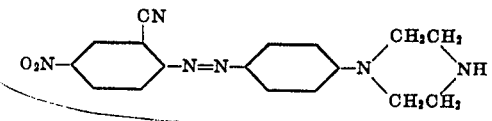

1 part of a neutralized reaction product of 1 mol of a higher alkylamine having about 20 carbon atoms with 30 mols of ethylene oxide (50 percent concentration), 1 part of concentrated acetic acid and 7 parts of water are ground in a ball mill to give a fine dispersion.

The dyestuff preparation thus obtained is added to a dyebath consisting of 4,000 parts of water and 4 parts of a 50 percent solution of a condensation product of 1 mol of 1-methyl-2-heptadecylbenzimidazole with 7 mols of ethylene oxide, which has been adjusted to a pH-value of 4 with acetic acid. 100 Parts of well-wetted polyacrylonitrile flocks are introduced, the liquor is heated to the boil during 30 minutes, and dyeing is carried out for 1½ hours at the boiling point. The dyed material is subsequently well rinsed. A level red dyeing having very good fastness to rubbing is obtained.

The dyestuff used above may be obtained by coupling diazotized 2-cyano-4-nitroaniline with N-phenylpiperazine in accordance with the usual methods.

The Table which follows lists a series of dyestuffs which can be obtained in the usual manner by coupling. Column V specifies the color of the dyeing or print obtained on polyacrylonitrile fibers with the dyestuffs. The dyestuffs correspond to the formula

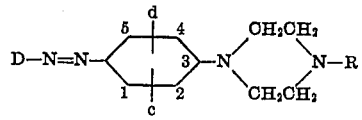

| I | | II | III | IV | V |
|---|---|---|---|---|---|
| D | | c | d | R | Colour |
| 1 | 2-chloro-4-nitrophenyl | H | H | H | Yellowish-tinged red. |
| 2 | 2,6-dichloro-4-nitrophenyl | H | H | H | Yellowish brown. |
| 3 | 2-chloro-4-methylsuphonylphenyl | H | H | H | Orange. |
| 4 | 4-chloro-2-trifluoromethylphenyl | H | H | H | Do. |
| 5 | 2,4,5-trichlorophenyl | H | H | H | Yellowish orange. |
| 6 | 2-methylsuphonyl-4-nitrophenyl | H | H | H | Red. |
| 7 | 5-nitro-2-thiazolyl | H | H | H | Violet. |
| 8 | 6-cyano-2-benzthiazolyl | H | H | H | Red. |
| 9 | 6-nitro-2-benzthiazolyl | H | H | H | Red. |
| 10 | 3-phenyl-1,2,4-thiadiazolyl-5 | H | H | H | Red. |
| 11 | 5-phenyl-1,3,4-thiadiazolyl | H | H | H | Red. |
| 12 | 2-cyano-4-nitrophenyl | 1-CH₃ | H | H | Red. |
| 13 | 2-chloro-4-nitrophenyl | 1-CH₃ | H | H | Yellowish-tinged red. |

Table – Continued

| I D | II c | III d | IV R | V Colour |
|---|---|---|---|---|
| 14. 2,6-dichloro-4-nitrophenyl | 1-CH₃ | H | H | Brown. |
| 15. 2-chloro-4-methylsulphonyl-phenyl | 1-CH₃ | H | H | Reddish orange. |
| 16. 4-chloro-2-trifluoromethylphenyl | 1-CH₃ | H | H | Orange. |
| 17. 2,4,5-trichlorophenyl | 1-CH₃ | H | H | Do. |
| 18. 5-nitro-2-thiazol 1 | 1-CH₃ | H | H | Violet. |
| 19. 6-cyano-2-benzthiazolyl | 1-CH₃ | H | H | Red. |
| 20. 6-nitro-2-benzthiazolyl | 1-CH₃ | H | H | Bluish-tinged red. |
| 21. 4-phenyl-1,2,4-thiadiazolyl-5 | 1-CH₃ | H | H | Red. |
| 22. 5-phenyl-1,3,4-thiadiazolyl-2 | 1-CH₃ | H | H | Red. |
| 23. 2,4-dinitrophenyl | 1-Cl | H | H | Red. |
| 24. 4-acetylphenyl | 1-Cl | H | H | Yellowish-tinged red. |
| 25. 4-carbethoxyphenyl | H | 4-Cl | H | Do. |
| 26. 4-nitrophenyl | 1-Cl | H | H | Do. |
| 27. 6-methylsulphonyl-2-benzthiazolyl | 1-Br | H | H | Ruby. |
| 28. 2,6-dichloro-4-dimethylaminosulphonylphenyl | 1-OCH₃ | H | H | Yellowish-tinged red. |
| 29. 5-chloro-2-phenoxyphenyl | 1-OCH₃ | H | H | Orange. |
| 30. 1-methyl-2-imidazolyl | 1-OCH₃ | H | H | Do. |
| 31. 4-cyanophenyl | 1-NHCOC₂H₅ | H | H | Yellowish-tinged red. |
| 32. 3-methyl-1,2,4-thiadiazolyl-5 | 1-NHCOC₂H₅ | H | H | Do. |
| 33. 2-carbomethoxy-4-nitro-phenyl | 1-NHCOC₂H₄Cl | H | H | Bluish-tinged red. |
| 34. 4-nitrophenyl | 1-NHCOCH₃ | H | H | Yellowish-tinged red. |
| 35. 4-bromophenyl | 1-NHSO₂CH₃ | H | H | Reddish orange. |
| 36. 2-chloro-5-trifluoromethyphenyl | 1-NHSO₂C₂H₅ | H | H | Do. |
| 37. 2-cyano-6-bromo-4-nitrophenyl | 1-CF₃ | H | H | Red. |
| 38. 5-methylsulphonyl-2-thiazolyl | 1-CF₃ | H | H | Reddish violet. |
| 39. 4-nitrophenyl | 1-phenoxy | H | H | Orange. |
| 40. 4-thiocyanatophenyl | H | 4-phenoxy | H | Do. |
| 41. 5-cyano-2-thiazolyl | 1-phenylmercapto | H | H | Violet. |
| 42. 2-chloro-4-nitrophenyl | 1-CH₃ | 4-OCH₃ | H | Bluish-tinged red. |
| 43. 4-aminosulphonylphenyl | 1-CH₃ | 4-OCH₃ | H | Scarlet. |
| 44. 3-methyl-4-nitro-1,2-isothiazolyl-5 | 1-CH₃ | 4-OCH₃ | H | Violet. |
| 45. 5-chloro-2,4-dinitrophenyl | 1-CH₃ | 4-OCH₃ | H | Blue. |
| 46. 2-cyano-4-nitrophenyl | 1-NHCOCH₃ | 4-OC₂H₅ | H | Do. |
| 47. 5-nitro-2-thiazolyl | 1-NHCOCH₃ | 4-OC₂H₅ | H | Do. |
| 48. 5-chloro-2-cyanophenyl | 1-NHCOCH₃ | 4-OCH₃ | H | Do. |
| 49. 6-chloro-2-benzthiazolyl | 1-NHCONHC₄H₉ | H | C₂H₄OH | Yellowish-tinged red. |
| 50. 2-bromo-4-dimethylaminosulphonylphenyl | 1-NHCOOC₂H₅ | H | C₂H₄CN | Bluish-tinged ren. |
| | 1-N—COCH₃ \| CH₃ | H | CH₃ | Red. |

EXAMPLE 2

A fine dispersion of the dyestuff of the formula

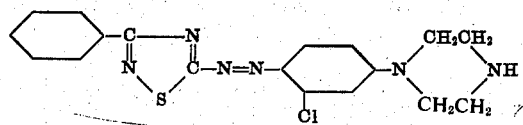

is manufactured as indicated in Example 1.

A printing paste is prepared from 100 parts of this dispersion, 50 parts of 40 percent acetic acid, 20 parts of thiodiethylene glycol, 600 parts of 50 percent gum arabic thickener and 230 parts of water. A polyacrylonitrile fabric is printed with this printing paste and after an intermediate drying is steamed with saturated steam at 0 to 0.75 atmospheres excess pressure for 30 minutes. The fabric is then washed and dried. A red print having very good fastness properties is obtained.

I claim:

1. A process for dyeing or printing acrylic textile material using a disperse dyestuff of the formula

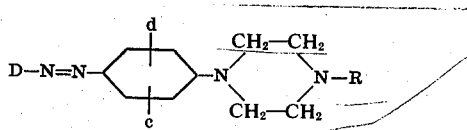

where D represents an aromatic or heterocyclic radical in the diazo component used to form the azo dye, R is hydrogen, unsubstituted lower alkyl or lower alkyl substituted by hydroxy or cyano, d is hydrogen, halogen, lower alkyl, lower alkoxy, aryloxy or arylmercapto, and c is hydrogen, halogen, lower alkyl, lower alkoxy, aryloxy, arylmercapto, trifluoromethyl, alkylsulphonyl, or a group of the formula —NR'Ac where R' is hydrogen or $C_1$ to $C_4$ alkyl and Ac is alkynoyl, benzoyl, halo alkynoyl, alkylsulphonyl, toluylsulphonyl, phenoxycarbonyl, methoxycarbonxyl, aminocarbonyl, $C_1$-$C_4$ alkylaminocarbonyl or phenylaminocarbonyl.

2. A process as claimed in claim 1, wherein a dyestuff of the formula

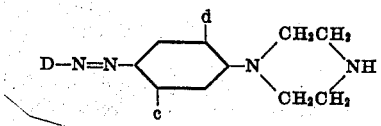

is used in which D is an unsubstituted or substituted monocyclic or bicyclic heterocyclic radical of the thiazole, benzothiazole, imidazole, thiadiazole or isothiazole series or a substituted benzene radial.

3. A process as claimed in claim 1, wherein a carpet made of or containing acrylic fibers is sued as textile material.

4. A process according to claim 1 in which

R is $C_1$-$C_4$ alkyl or the hydroxy or cyano derivative thereof, is hydrogen, chlorine, $C_1$-$C_4$ alkyl, $C_1$-$C_4$ alkoxy, phenoxy or phenylmercapto is hydrogen, chlorine, bromine, $C_1$-$C_4$ alkyl, $C_1$-$C_4$ alkoxy, phenoxy, phenylmercapto, trifluoromethyl, $C_1$-$C_4$ alkylsulphonyl, or -NR'Ac where R' is hydrogen or methyl and Ac is formyl, acetyl, propionyl, benzoyl, chloroacetyl, methane sulphonyl, ethane sulphonyl, p-toluene monosulphonyl, phenoxycarbonyl, methoxycarbonyl, aminocarbonyl, $C_1$-$C_4$ alkylaminocarbonyl or phenylaminocarbonyl.

5. A process according to claim 4 in which D is a substituted phenyl group.

6. A process according to claim 4 in which D is a heterocyclic radical containing one or two rings, the heterocyclic ring containing 5 members.

7. A process according to claim 6 in which the heterocyclic ring contains two or three hetero-atoms, at least one of which is nitrogen and the remaining hetero-atoms being selected from nitrogen, oxygen and sulphur.

* * * * *

PO-1050
(5/69)

UNITED STATES PATENT OFFICE
CERTIFICATE OF CORRECTION

Patent No. 3,650,665          Dated March 21, 1972

Inventor(s) RAMANATHAN

It is certified that error appears in the above-identified patent and that said Letters Patent are hereby corrected as shown below:

Column 6, claim 1, line 36, delete "methoxycarbonxyl" and substitute --- methoxycarbonyl ---.

Column 6, claim 2, line 48, delete "radial" and substitute --- radical ---.

Column 6, claim 2, line 50, delete "radial" and substitute --- radical ---.

Column 6, claim 3, line 52, delete "sued" and substitute --- used ---.

Column 6, claim 4, line 55, before "is hydrogen," insert --- d ---.

Column 6, claim 4, line 57, before "is hydrogen," insert --- c ---.

Signed and sealed this 5th day of September 1972.

(SEAL)
Attest:

EDWARD M. FLETCHER, JR.
Attesting Officer

ROBERT GOTTSCHALK
Commissioner of Patents